Dec. 10, 1929.  F. F. STARR  1,738,542
ELECTRICAL APPARATUS
Filed Jan. 31, 1924  4 Sheets-Sheet 3

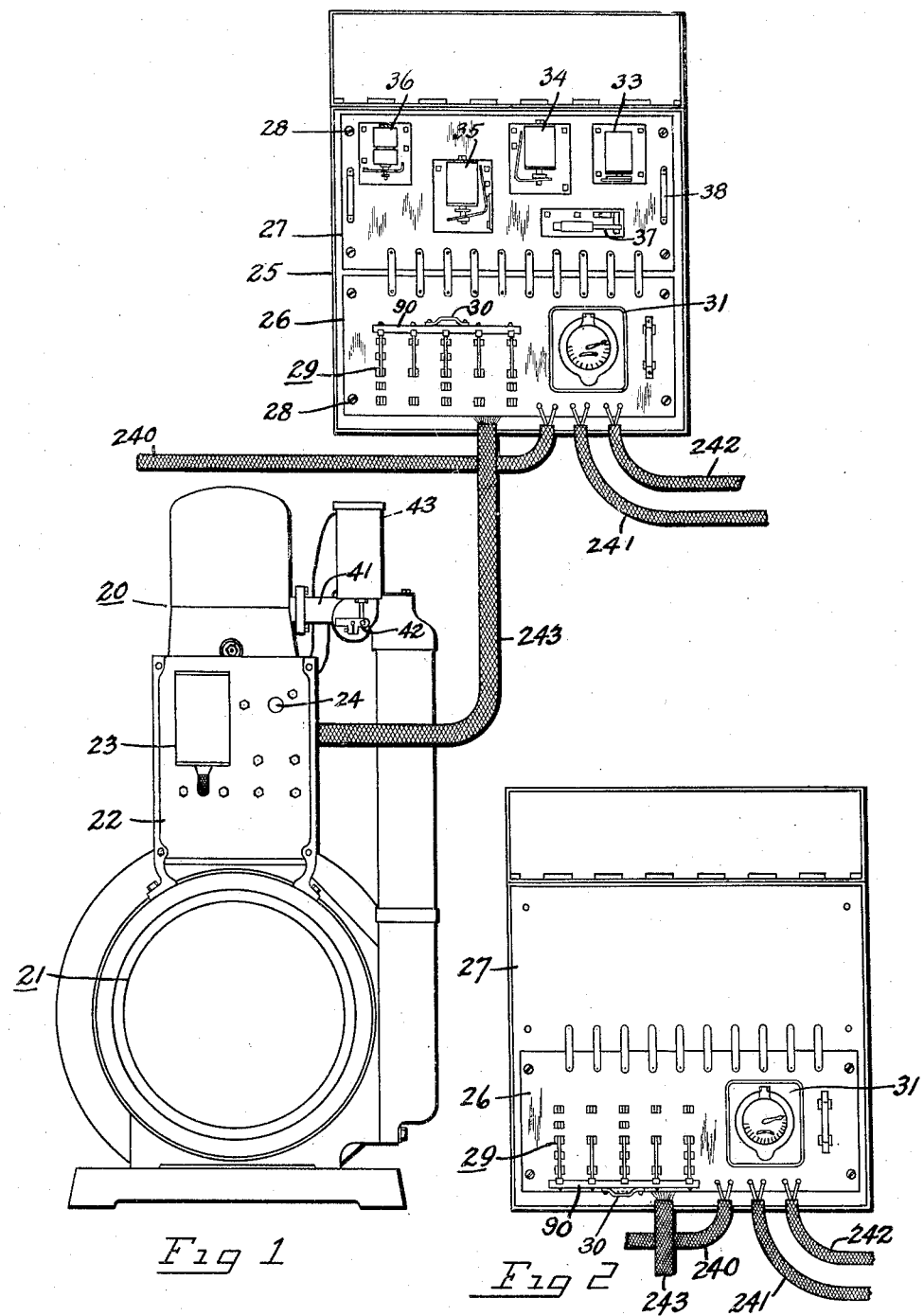

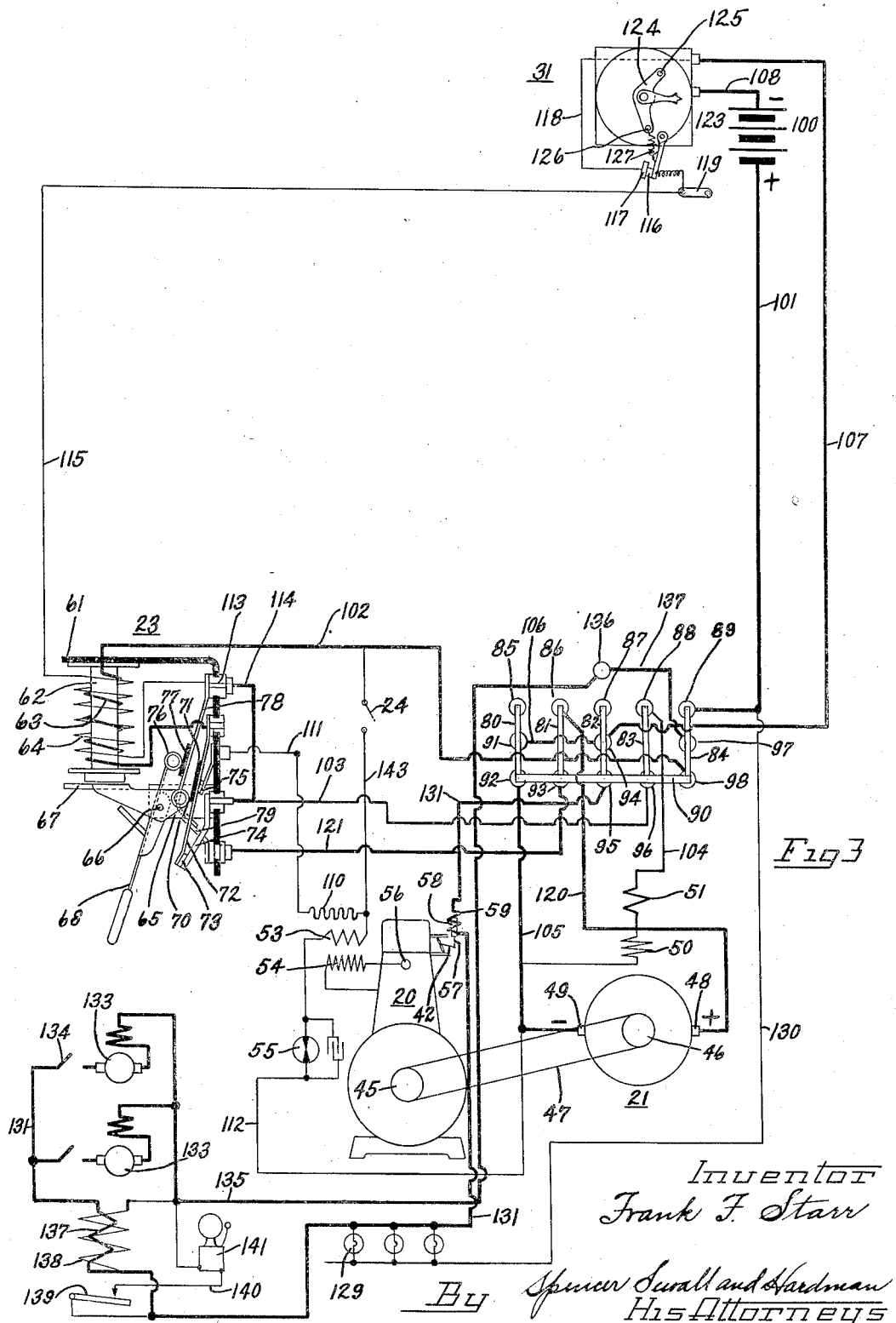

Inventor
Frank F. Starr
By Spencer Surall and Hardman
His Attorneys

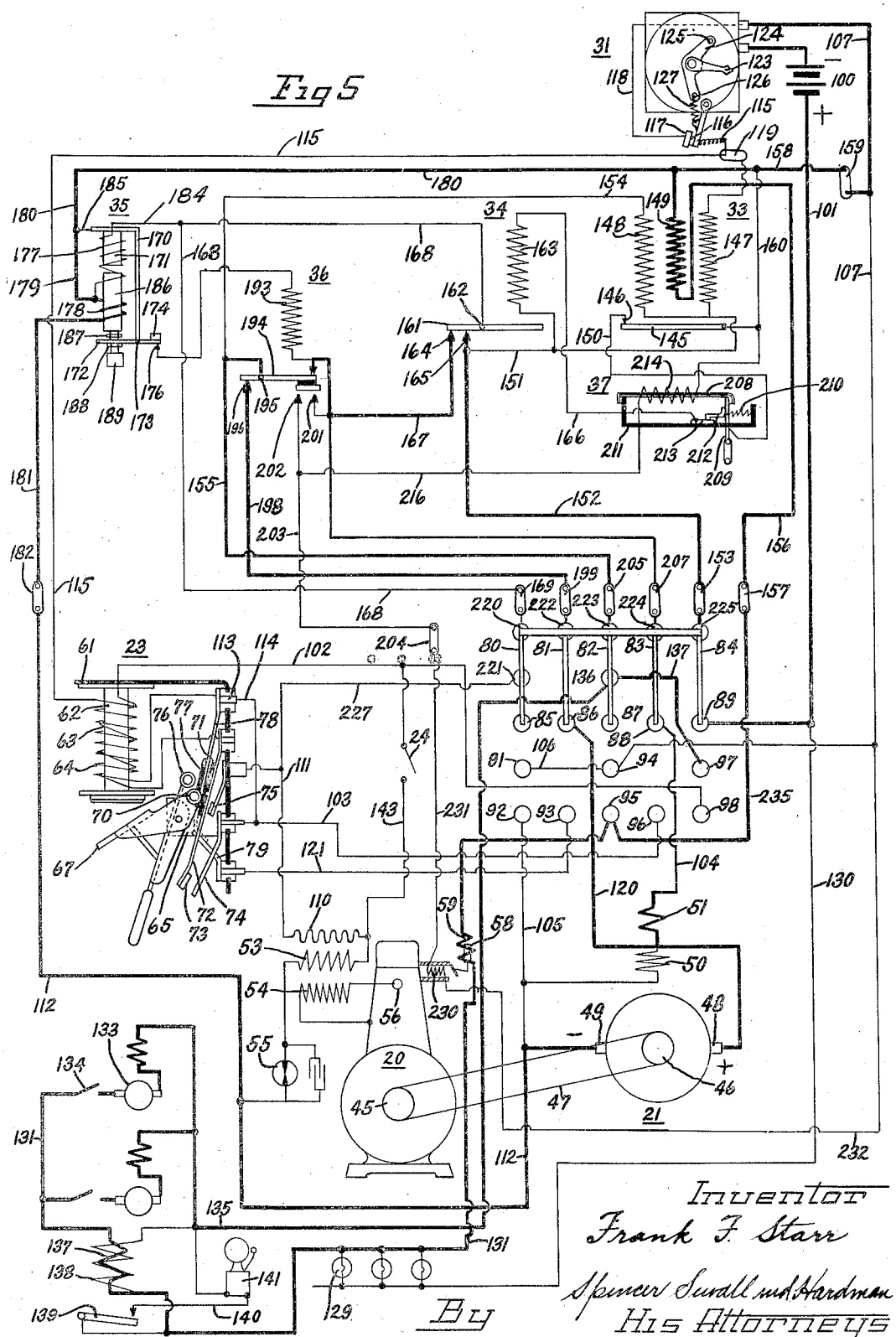

Patented Dec. 10, 1929

1,738,542

UNITED STATES PATENT OFFICE

FRANK F. STARR, OF DAYTON, OHIO, ASSIGNOR TO DELCO-LIGHT COMPANY, OF DAYTON, OHIO, A CORPORATION OF DELAWARE

ELECTRICAL APPARATUS

Application filed January 31, 1924. Serial No. 689,602.

The present invention relates to systems of electrical generation and battery charging, and particularly to that type of system in which a generator is driven by an engine for producing electrical current for supplying a work circuit such as a power circuit including motors for charging a storage battery.

One of the objects of the invention is to start an electrical generating plant either at will or automatically in response to some condition such as a demand for current, and stop the plant automatically when a certain demand for current ceases.

To accomplish this object, one form of the invention includes two systems of control, either system being rendered operative and the other inoperative by a manually operated selecting switch. One system provides for starting the plant manually and for stopping automatically in response to a certain state of battery charge. The other system provides for starting the plant automatically in response to a current demand and for stopping when the current demand ceases, one condition being that the battery has reached a certain state of charge. The former type of system is used generally only when the latter type is not functioning correctly.

Other and further objects and advantages of the present invention will be apparent from the following description, reference being had to the accompanying drawings, wherein a preferred embodiment of one form of the present invention is clearly shown.

In the drawings:

Fig. 1 is an elevation of an electrical generating plant and controlling apparatus conditioned for full automatic control;

Fig. 2 is an elevational view of an instrument board shown in Fig. 1, certain devices of the full automatic system being removed and showing the remaining parts on the board conditioned for manual starting and automatic stopping of the plant;

Fig. 3 is a wiring diagram of the manual starting and automatic stopping system;

Fig. 5 is a wiring diagram of the combined systems.

Power plant

Figure 4:
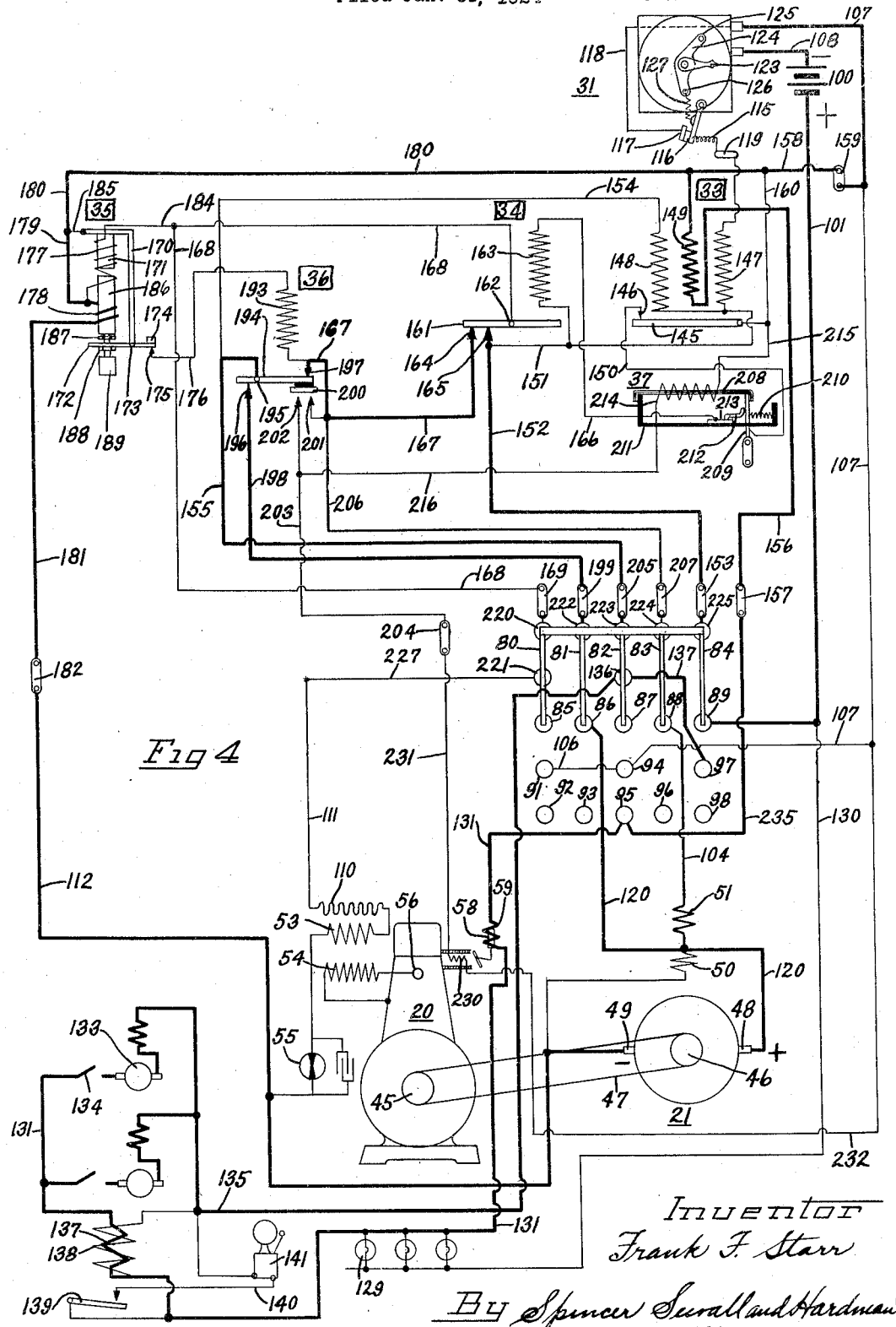
Fig. 4 is a wiring diagram of the automatic starting and stopping system.

In the drawings, 20 designates an internal combustion engine, driving a generator 21, the engine and generator forming a unitary structure known as a power plant or unit. The power unit supports a switch panel 22 on which are mounted a manually operable starting switch 23 and a push button operated ignition switch 24 to be used in a special way to be described. A control box 25, mounted on a support independently of the power unit, carries separately removable switch panels 26 and 27 which are held in place by screws 28.

A circuit selecting switch determines the method of control of the plant

Panel 26 carries a double-throw circuit selecting switch 29, operable by a handle 30; when switch 29 is placed in the position shown in Fig. 1, the plant is controlled by a full automatic starting and stopping system; and when switch 29 is placed in the position shown in Fig. 2, the plant is controlled by a manual starting and automatic stopping system.

Panel 26 also carries an ampere hour meter which registers the current flow to and from the battery and is adapted to actuate certain circuits for controlling the automatic system and the manual starting and automatic stopping system. The power, light, and battery circuits to be described later, are connected to the panel 26 at suitable terminals located adjacent the lower edge thereof.

Full automatic control panel

Panel 27 carries a starting switch relay 33, a starting switch 34, a load-switch relay 36, a load-switch 35, and a cranking cut-out 37. Handles 38 are provided on the panel 27 to facilitate the mounting and removal of the panel with respect to the box 25 and lower panel 26. The wires connecting the various instruments on the panel 27 are connected to a series of terminals adjacent the lower edge thereof; these terminals are detachably secured to a series of jumpers or straps which are connected at their other ends to a series of terminals adjacent the upper edge of panel 26. By disconnecting the straps from the terminals and by removing the screws 28 from the panel 27, the panel can be removed for repair. When the mechanism upon the panel 27 is being repaired, the plant can be controlled by the semi-automatic system including the manual controlling switch 23 and the plant can be started manually and stopped automatically.

In the disclosed embodiment of this invention, the engine 20 is an internal combustion engine which is provided with a fuel intake 41 and a throttle lever 42 which is controlled by an electro-magnet herein shown as a solenoid 43.

Semiautomatic system of control

Referring to Fig. 3, the generator 21 is preferably directly connected with the engine 20, but in Fig. 3 this mechanical connection is represented by pulleys 45 and 46, and a belt 47. The generator includes brushes 48 and 49, and a shunt field winding 50, and a series field winding 51.

Ignition for the engine is provided by means of an ignition coil having a primary winding 53 and a secondary winding 54, the primary winding being connected with a timer 55, and a source of current to be described, and the secondary winding being grounded and connected with a spark plug 56.

The engine governor includes a rod 57 which is connected to the throttle lever 42 and which is actuated by a movable core 58 which cooperates with an electro-magnetic winding 59.

The manually operated starting switch 23 includes a frame 61 supporting a magnet core 62 which carries a coarse winding 63 and a fine winding 64. The frame 61 also supports a post 65 carrying a pin 66 upon which are pivotally mounted an armature 67 and a hand lever 68. Armature 67, when in the position shown in Fig. 3, is held adjacent the core 62 due to the magnetic effect of the cooperating energizing windings 63 and 64. Armature 67 carries a roller 70 which engages a nonconducting block 71 carried on a switch blade having a contact 73 for engaging a contact 74. A resiliently mounted contact 75 is adapted to be engaged by the switch blade 72. Lever 68 carries a roller 76 for engaging a nonconducting block 77 carried on a switch blade 78 which normally engages a contact 79.

The selecting switch 29 includes switch blades 80, 81, 82, 83 and 84, pivotally attached to posts 85, 86, 87, 88 and 89, respectively. These blades are all connected with a nonconducting bar 90, to which the handle 30 is connected and with which all of the blades are simultaneously operated. When the bar 90 is moved downwardly into circuit making position, as shown in Fig. 3, the blade 80 engages contacts 91 and 92; blade 81 engages contact 93; blade 82 engages contacts 94 and 95; blade 83 engages contact 96; and blade 84 engages contacts 97 and 98. With the selecting switch 29 in a position shown in Fig. 3, the electrical system is in condition for plant starting by the starting switch 23.

The system as is shown in Fig. 3, is in operation, the armature 67 of the starting switch 23 being shown in its attracted position in which position contact is made between contacts 73 and 74, and between the blade 72 and contact 75. The lever 68 is also shown in such position whereby the contact blade 78 engages contact 79. When the plant is not in operation the armature 67 is in its lower position as shown in Fig. 5, and contacts 73 and 74 are not in engagement, and contact 75 is not in engagement with blade 72.

Operation of the semi-automatic system

To start the plant manually, the starting switch lever is pulled upwardly, which causes contact 73 to engage contact 74 and causes blade 72 to engage contact 75; the roller 76 will be actuated and will cause blade 78 to be separated from contact 79. When the starting switch lever 68 has thus been operated, current will flow from a storage battery 100 through wire 101 to post 89, blade 84, contact 98, wire 102, winding 63 of the starting switch 23, blade 72, contact 73, contact 74, wire 103, contact 96, blade 83, post 88, wire 104, series field winding 51, dynamo brush 48, through the armature, dynamo brush 49, wire 105, contact 92, blade 80, contact 91, jumper 106, contact 94, wire 107, ampere hour meter 31, and thence by wire 108 to the opposite side of the battery. At the same time the shunt field will be operative since it is connected across the brushes 48 and 49. The motor therefore functions as a compound wound motor for cranking the engine. Ignition current for the engine will be provided since the ignition primary winding 53 and timer 55 are provided with circuit connections to the battery in the following manner: Primary winding 53 is connected in series with a resistance coil 110 which in turn is connected by wire 111 to the starting switch ignition contact 75 which is engaged by blade 72 on the positive side of the line. Timer 55 is connected by wire 112 to the wire 105 on the negative side of the line.

At this time the shunt winding 64 of controller 23 is receiving current from the battery since it is connected with the positive side of the line to the terminal post 113 of switch 23, wire 114, to wire 103. The other end of winding 64 is connected by wire 115 to one end of a detachable panel strap 119, said end also being connected to a movable contact 116 of ampere hour meter 31, which is normally in contact with contact 117, thence by wire 118 to the meter 31, through the meter and wire 108 to battery. When the battery 100 discharges into the generator 21, the magnetic effect of winding 63 is in opposition to the magnetic effect of winding 64 and the armature 67 will not be attracted. But when the engine becomes self-operative and attains a sufficient speed for the generator to charge the battery, then current in the heavy or series winding 63 will be reverse from that when cranking and said winding 63 will produce a magneto-motive force which assists winding 64. Armature 67 will then be held in its attracted position and the lever 68 can be released and the switch will be in the position shown in Fig. 3 in which the battery charging and ignition circuits will be maintained. After lever 68 has been released, contact blade 78 will re-engage contact 79. The positive side of the dynamo will then be connected to the positive side of battery by wire 120, post 86, blade 81, contact 93, wire 121, contacts 79, blade 78, wire 114 which is connected to the positive terminal 74 of switch 23 by wire 103, thus short circuiting the dynamo series field winding 51, whereby this dynamo will function as a shunt wound generator. The battery charging circuit is the same as the cranking circuit except for the short circuit around the series field winding 51 during generating.

*When battery is fully charged the plant stops automatically provided there is no other current demand in excess of a certain amount*

Current passing through the ampere hour meter 31 will cause the actuation of a shaft (not shown) to rotate the hand 123. A bell crank lever 124 is pivotally mounted on the meter and is provided at its ends with studs 125 and 126. Stud 126 is connected by a spring 127 with a movable arm which carries contact 116. During battery charging operation, the hand 123 moves in a counter clockwise direction and the meter operates so that when the battery is charged, the hand 123 will have moved far enough to engage the stud 125 to rotate the lever 124 to cause the spring 127 to separate contact 116 from contact 117. Clockwise rotation causes hand 123 to engage stud 126 to effect the return of contact 116 into engagement with contact 117.

When the battery becomes fully charged and the meter contacts 116 and 117 are separated, the circuit of the shunt winding 64 of the starting switch 23 is interrupted and, as will be explained hereinafter, if the generator is only supplying current for the battery or the generator demand is below a certain amount, the armature 67 of starting switch 23 will drop out, because the ampere turns produced by the series winding 63 are not sufficient to hold it up. When the armature drops out, the contact 73 will separate from contact 74 and blade 72 will move away from contact 75 to thereby interrupt the circuit between the battery and dynamo and battery and ignition coil, respectively, whereby the engine will cease to function.

Current is also supplied to a lighting circuit including light 129 by the battery 100 or generator 21. The light circuit is connected by wire 130 to wire 101 on the positive side of the system and by wire 131 including coil 59, contact 95, blade 82, and contact 94 which is included in the negative side of the system.

Current is also supplied by the generator or battery to a work or power circuit including motors 133 or the like, each of which are controlled individually by a switch 134. One side of the power circuit includes wire 135, contact 136, jumper 137, contact 97, blade 84, contact 98, which is connected to the positive side of the generator or blade 84, to post 89 which is connected to the positive side of the battery. The negative side of the work circuit includes wire 131 which forms the negative side of the lighting circuit. All of the current consumed in the lighting and power circuits passes over wire 131 and likewise through the coil 59 and energizes said coil whereby the core 58 will actuate the throttle lever 42 which, when the engine is operating regulates the speed of the engine and current output of the generator.

*When the current demand is for battery charging only, the engine speed is limited so that battery is charged at proper rate*

The engine throttle control coil 59 is not in the battery charging circuit and when no current is being consumed in the lighting or power circuit, the throttle valve is not actuated by the magnet coil 59 but is held by a spring in such a position that the engine will operate to cause the generation of the desired battery charging current, for example, approximately 14 to 17 amperes, the current varying somewhat according to the state of charge of the battery. The solenoid 43 is constructed so that approximately 14 amperes of current is necessary in the coil 59 before the plunger 58 is actuated to open the throttle valve. Therefore, if a device or devices are connected in the lighting or power circuit and are consuming less than 14 amperes, the generator output is not increased and the battery will only receive current to the amount of the difference between that consumed in the light power circuit and the amount generated.

*If the current demand in the work circuits exceeds the battery charging rate (approximately 14 to 17 amperes) the throttle valve will be opened accordingly and the battery will float on the line, receiving only, if any, a small amount of current.— If, when the battery becomes fully charged there exists another demand for current in excess of a certain amount, the plant will continue operating, but will stop automatically when this other demand falls below a certain amount*

It will be noted that during generating operation, the current being consumed in the light and power circuits passes through the series winding 63 of starting switch 23. If current in excess of a predetermined amount is being consumed, the ampere turns in the series winding 63 is sufficient to hold up the armature 67 without the aid of the shunt winding 64. Therefore, it is apparent that if the battery should become fully charged and the ampere hour meter contacts 116 and 117 are separated, and if current is being consumed in either the light or power or both circuits combined in excess of a certain amount, for example, 18 amperes at 32 volts, the plant will remain operative until the current being consumed falls below said predetermined amount.

*If the battery is fully charged and there is such a demand by the work circuits as to maintain the plant operative, the work circuits will consume substantially the entire output of the generator and the battery floats on the line*

The advantage of placing the throttle coil 59 in the work circuits and constructing the solenoid 43 so that the speed of the plant is not changed until the required load is applied to the work circuits will be apparent when considering same as being applied to a system as is herein described in which it is desirable to maintain the plant operative for supplying current to the work circuits even though the battery is charged. If the battery becomes fully charged, and if less current is being consumed in the work circuits than that required to maintain armature 67 up, the plant will stop. However, if the work circuits are consuming enough current to maintain the armature 67 up, the plant will remain operative. The throttle valve regulates the speed of the engine and likewise the generator output so that the current output is substantially equal to the demand in the work circuits, and therefore the fully charged battery will receive only a small amount, if any, current.

*A signalling device is provided in the power circuit which is adapted to signal to the attendant when the generator is being overloaded*

The signalling device includes a relay having a winding 137 in series with the power circuit wire 131, and a shunt winding 138 connected across wire 135 and wire 131 and is wound to produce a magneto-motive force in opposition to that produced by winding 137. When current is being consumed in excess of a certain amount, the magnetic effect produced by winding 137 is in excess of that produced by winding 138 to such an amount that the armature 139 of the relay will be attracted. The attraction of armature 139 will cause a shunt circuit 140, connected across wires 135 and 131 and including a bell 141, to be energized.

*A special ignition push switch is used to obtain ignition while hand-cranking the engine*

When the charge of the battery is exceptionally low and the current in the battery is not sufficient to crank the engine, it is not necessary to operate the starting switch lever 68 in order to provide ignition current while hand cranking the engine. While the operator cranks the engine with one hand by a suitable hand crank, the other may be used to close the push button switch 24. When this switch is closed, current will be supplied to ignition primary winding 53 by wire 143, switch 24, to wire 102 on the positive side of the line, while the connections for the other end of coil 53 will be the same as during the normal cranking operation. It is to be noted that by completing the ignition circuit through switch 24, the ignition resistance coil 110 is not connected in series with primary winding 53. In this manner, a relatively heavy current passes through the primary winding 53 even though the battery charge is low. After the engine becomes self operative, the attendant can pull upwardly on the lever 68, while still maintaining switch 24 closed and then switch 24 can be released.

The plant can be manually stopped by choking off the air to the intake of the engine or by opening the selecting switch 29.

*Full automatic system of control*

Referring to Fig. 4, the starting switch relay 33 includes a movable armature 145 adapted to engage a contact 146, and includes relatively high resistance windings 147 and 148, and a relatively low resistance winding 149. Contact 146 is connected to a wire 150. Each of these windings will cause the attraction of armature 145. One end of each of the windings 147 and 148 are connected by wire 151 to a wire 152; the other end of winding 147 is connected to the detachable panel strap 119; the other end of winding 148 is connected by a wire 154 to a wire 155. One end of winding 149 is connected by a wire 156 to a strap 157, and the other end is connected by a wire 158 to a strap 159. Armature 145 is also connected to wire 158 by a wire 160.

The starting switch 34 includes an armature 161 pivoted at 162 and is adapted to be attracted by a magnet winding 163 and is adapted to bridge contacts 164 and 165. Winding 163 is connected at one end to wire 151 and at the other end to wire 166. Contact 165 is connected by wire 152 to strap 153, and contact 164 is connected to wire 167. Armature 161 is connected at the pivot 162 with a wire 168 which in turn is connected to strap 169.

The load switch relay 35 includes a frame 170 supporting a stationary core 171 and a pivotally mounted armature 172 pivoted at 173 and carrying a weight 174. Armature 172 engages a contact 175 which is connected to wire 176. Relay 35 is provided with a shunt winding 177 and a series winding 178; the shunt winding is located above the series winding for a purpose to be explained. Series winding 178 is connected by wire 179 to wire 180 and to wire 158 at one end, and at the other end by wire 181 to strap 182. Shunt winding 177 is connected at one end to wire 179, and at the other end to wire 184. Shunt coil 177 surrounds the core 171 and extends below said core. A plunger 186 is surrounded by the series winding 178 and extends within the lower end of shunt winding 177. Plunger 186 extends through an opening in the armature 172, and is provided with two adjustable nuts 187 and 188 which are located on opposite sides of said armature. When neither of the nuts 187 or 188 engage the armature 172, the weight 174 closes or maintains closed the connection between said armature and the contact 175; however, the weight of the plunger 186 and a weight 189 carried thereby, is sufficient to overbalance the weight 174 when the plunger 186 is no longer held in attracted position, and nut 187 engages the top side of armature 172, the purpose of which will be explained later.

The load switch 36 includes a magnetic winding 193 connected at one end to wire 176 and at the other end to wire 167. An armature 194 is pivoted at 195 and is adapted, when attracted by winding 193 to engage contacts 196 and 197. Contact 196 is connected by wire 198 to strap 199 and contact 197 is connected to wire 167. Armature 194 carries a contact 200 insulated therefrom and adapted, when the armature is not in its attracted position, to bridge contacts 201 and 202. Contact 201 is connected to wire 167 and contact 202 is connected by wire 203 to strap 204. Armature 194 is grounded at pivot 195 to wire 155 which is connected to strap 205. A wire 206 is connected to wire 167 and to a strap 207.

The cranking cut-out 37 includes a resilient bimetal member 208 which serves as a latch for lever 209 and maintains it in the position shown against the tension of a spring 210. Spring 210 is connected to a nonconducting base 211. Lever 209 carries a contact 212 for engaging a contact 213. When the bimetal member 208 is heated it will bow upwardly and release the lever 209 causing contacts 212 to separate from contact 213. The bimetal member 208 is heated by a heating coil 214 which is connected at one end by wire 215 to wire 160 and at the other end by wire 216 to wire 203. The lever 209 and likewise contact 212 are connected to wire 150; and contact 213 is connected with wire 166.

When the selecting switch 29 is in the position shown in Fig. 4, blade 80 thereof engages contacts 220 and 221; blade 81 engages contact 222; blade 82 engages contacts 223 and 136; blade 83 engages contact 224; and blade 84 engages contact 225. Contacts 220, 222, 223, 224, and 225 are connected respectively to straps 169, 199, 205, 207, and 153, while contact 221 is connected by wire 227 to wire 111 of the ignition circuit.

*Operation of full automatic system of control.—A low state of battery charge causes the plant to start*

Assuming that the battery 100 has reached such a discharge that the ampere hour meter contacts 116 and 117 are moved into engagement by the hand 123, the winding 147 of the starting switch relay 33 will be energized through the following circuit: Battery 100, wire 101, post 89, blade 84, contact 225, strap 153, wires 152 and 151, winding 147, strap 119, contacts 116 and 117, wire 118, ampere hour meter 31, wire 108 back to battery. Armature 145 of relay 33 will then be attracted to close the connection between armature 145 and contact 146 to establish the following circuit to the starting switch winding 163: battery to wire 152 as previously described, wire 151, winding 163 of starting switch 34, wire 166, contacts 213 and 212, wire 150, contact 146, armature 145, wires 160 and 158, strap 159, wire 107, to meter 31, wire 108 to battery. Armature 161 of starting switch 34 will now be attracted to bridge contacts 164 and 165 to complete the circuit from the battery to the dynamo for cranking the engine over the following circuit: Wire 152 on the positive side of the battery contacts 165 and 164, wires 167 and 206, strap 207, contact 224, blade 83, post 88, wire 104, series field 51, wire 120, brush 48, armature of generator 21, brush 49, wire 112, strap 182, wire 181, winding 178 of relay 35, wires 180 and 158, and strap 159 connected on negative side of battery as previously described. The shunt winding 177 of relay 35 will also be energized, the current therefor passing over wire 152, contact 165, armature 161, pivot 162, wires 168 and 184, winding 177 to wire 180. The direction of current flow over winding 178 is such as to produce a magnetic field of such polarity as to repel the magnetic field produced by shunt winding 177 during the cranking operation. The opposing effect of winding 178 causes the plunger 186 to be held in its downward position in which nut 187 engages armature 172 to maintain the circuit open between armature 172 and contact 175 for a purpose to be described.

The following ignition circuit is completed by the engagement of armature 161 of switch 34 with contact 165: Wire 152 on the positive side of battery, contact 165, armature 161, pivot 162, wire 168, strap 169, contact 220, blade 80, contact 221, wire 227, and wire 111, ignition resistance 110, primary winding 53, timer 55, wire 112, strap 182 on the negative side of the battery. While the engine is being cranked, the following circuit is completed to the fuel heating coil 230 of the engine: Wire 152, contacts 165 and 164, wire 167, contact 201, bridging contact 200, contact 202, wire 203, strap 204, a wire 231, heating coil 230, wires 232 and 107 on the negative side of the battery. At the same time heating coil 214 of cranking cut-out 37 is connected by wire 216 which is connected to wire 203 on the positive side of battery and by wires 160 and 158 to the strap 159 on the negative side.

*If engine does not become self operative within a reasonable time, the cranking and ignition circuits are automatically broken*

Normally the engine will become self operative within reasonable time, but should it fail to start for any reason within a certain length of time, the heating coil 214 of the cranking cut-out 37 being energized will cause the blade 208 to bow upwardly and unlatch the lever 209 causing contact 212 to separate from contact 213 to interrupt the circuit to the winding 163 of the switch 34, whereby armature 161 will move away from contacts 164 and 165, thereby breaking the cranking and ignition circuits. In this manner the battery is not discharged to a great extent by endeavoring to crank an inoperative engine.

*When the engine attains a generating speed, a work circuit is closed automatically and the characterstics of the generator are changed so that the voltage quickly increases*

When the engine becomes self operative and "picks up" in speed, the generator voltage increases, and when generator current builds to a certain amount, the plunger 186 of relay 35 will be attracted and the armature 172 will engage contact 175 to complete the circuit to the magnetic winding 193 of load switch 36 over the following circuit: Wire 167 on the positive side of the system, winding 193, wire 176, contact 175, armature 172, frame 170, ground wire 185, wire 180, on the negative side of the system. Armature 194 of the load switch 36 will then be attracted to separate contact 200 from contacts 201 and 202 and thereby interrupt the circuits to the fuel heating coil 230 and to the heating coil 214 of cranking cut-out 37. At the same time, armature 194 will engage contacts 196 and 197 which causes the generator series field winding 51, wire 104, post 88, blade 83, contact 224, strap 207, wire 206, to be short circuited by a circuit including wire 120, post 86, blade 81, contact 222, strap 199, wire 198, contact 196, armature 194, contact 197, and wire 167. The generating current continues over wire 167, contacts 164, and 165, wire 152, strap 153, contact 225, blade 84, contact 89, wire 101, battery 100, wire 108, meter 31, wire 107, strap 159, wires 158 and 180, series coil 178, wire 181, strap 182, and by wire 112 to negative brush 49. The characteristics of the dynamo are changed and it is now functioning as a shunt wound generator. During the generating operation, the direction of current flow in winding 178 of relay 35 is reversed from that when cranking, said winding now assists winding 177 to maintain the plunger 186 in a raised position.

When the load switch armature 194 is closed current is supplied to the power circuit as follows: Strap 199 on the positive side of the generator, wire 198, contact 196, armature 194, pivot 195, wire 155, strap 205, contact 223, blade 82, contact 136, wire 135, to the load, then by wire 131 including coil 59, contact 95, a wire 235, strap 157, wire 156, series winding 149 of relay 33, wire 180 on the negative side of the generator.

*It is apparent that no current will flow to the power circuit until the plant is operating as a generator*

In this manner the battery is not subjected to a heavy discharge necessary for supplying the demand of the power circuit. Current for cranking the engine and current for the power circuit cannot be drained from the battery simultaneously.

*A full state of battery charge will cause plant to stop automatically provided there is no demand whatever in the power circuit or no demand in the light circuit above a certain amount*

The charge to the battery will continue until the battery is charged at which time the ampere hour meter hand 123 will have moved in a counter clockwise direction a sufficient distance whereby the lever 124 will be moved by the stud 125 a sufficient distance to cause contacts 116 and 117 to be separated. Unless current is flowing in the power circuit, or an excess demand in the light circuit, there will be no energization of the windings of relay 33 because the separation of meter contacts 116 and 117 interrupts the circuit to winding 147. However, if current is flowing in the power circuit for operating one of the motors 133 or other device which consumes a relatively large amount of current, the relay winding 149 will be energized sufficiently to hold armature 145 in attracted position. Therefore, the attaining of a certain state of battery charge will not stop the plant automatically, in a manner to be explained later, as long as the power circuit is in operation or provided there is an excess demand in the light circuit, and before this state of charge is attained the turning on and off of the power circuit current does not affect the operation of the plant, provided the plant has once been put into operation automatically by virtue of a demand by the battery for a charging current.

When relay 33 is deenergized in the manner described, armature 145 will drop out causing the circuit to the winding 163 of starting switch 34 to be interrupted at contact 146 and armature 145 of relay 33. Armature 161 of switch 34 will then drop out to break the connection between contacts 164 and 165, thereby interrupting the circuit between the battery and generator including the series winding 178 of relay 35, interrupting the connection to wire 168 to break the ignition circuit and the circuit to winding 177 of relay 35. Both windings 177 and 178 will then be deenergized and the plunger 186 will then drop out to actuate armature 172 whereby said armature will be separated from contact 175 to break the circuit of the winding 193 of load switch 36 and permit the armature of said switch to drop out.

*The starting of the plant may be effected automatically whenever there is demand for current in power circuit*

When it is desirable to use one of the motors 133, the switch 134, therefore, is closed. The motor will not start to operate but the following circuit will be established: Wire 152 on the positive side of the line, wire 151, relay winding 148 of relay 33, wires 154 and 155, strap 205, contact 223, blade 82, contact 136, wire 135, motor 133, switch 134, wire 131, contact 95, wire 235, strap 157, wire 156, winding 149, wire 158, to strap 159 on the negative side of the battery. Winding 148 when energized will attract armature 145 to start the plant in the same manner as described in connection with the ampere hour meter control. During the starting of the plant, high resistance winding 148 is in series with the power circuit, therefore, the discharge of the battery is minimized to such an extent that the current supplied to the power circuit is insufficient to cause the load thereon to function. But, after the plant becomes self operative and the load switch 36 is closed, winding 148 will be short circuited and the full amount of current passes over series winding 149 and maintains relay 33 closed.

*It is pointed out again that the required amount of current for causing the functioning of the load in the power circuit is withheld by the automatic mechanism until after the dynamo is operating as a generator and generating current at a predetermined value.—Excess demand in the light circuit causes the plant to start automatically*

Current for lights 129 or small current consuming device in the lighting circuit is generally supplied directly by the battery over the following circuit: Battery 100, wires 101 and 130, across the load, wire 131 including coil 59, contact 95, wire 235, strap 157, wire 156 including relay series winding 149, wire 158, strap 159 on the negative side of the battery. Under ordinary conditions the demand of current in lighting circuit is not sufficient to energize winding 149 sufficiently to attract armature 145. However, if the current demand exceeds a predetermined amount, the winding 149 will cause the armature to be attracted to automatically start the plant as was previously described.

*If the battery is fully charged, it will then float on the line while the work circuits consume substantially all of the current supplied by the generator*

It is again pointed out that the throttle valve is not actuated until the demand in the work circuits exceeds a certain amount (approximately 14 to 17 amperes). The current necessary in winding 149, to maintain the armature 145 closed, is approximately 12 amperes which is substantially equal to the output of the generator when the generator is supplying current for battery charging only, and it therefore follows that if sufficient current is being consumed in the lighting circuit to maintain said armature 145 closed, substantially all of the current generated will be consumed by the devices in the lighting circuit and only a small amount of current will be supplied to the fully charged battery. The same is true in regard to the power circuit. Devices placed in the power circuit should consume at least sufficient current to maintain the armature 145 closed. Devices of this size will consume an amount of current substantially equal to the minimum output of the generator. If additional devices are added to the circuit, the output of the generator is increased accordingly and at no time will a heavy current be supplied to the battery when the battery is fully charged.

*When the demand for current in the power circuit or excess demand in the light circuit ceases, the plant will stop automatically as described in connection with automatic stopping when the battery is charged*

If during the generating operation the engine ceases to operate, the speed of the generator will decrease and there will be a reversal of current in series winding 178 of relay 35, then winding 178 will oppose the magnetic effect of winding 177 whereby plunger 186 will drop out and break the circuit to winding 193 of load switch 36. The armature 194 will drop out and immediately interrupt the power circuit and also the cranking circuit will be completed including generator series field winding 51. The cranking circuit, however, will be interrupted after a predetermined length of time because, when the armature 194 drops out the circuit to the heating coil 214 of cranking cut-out 37 is again completed at contacts 201 and 202, to interrupt as previously described the circuit to winding 163 of starting switch 34 to break the cranking circuit at contact 164 and 165.

*The load switch relay and associated circuits*

The load switch relay 35 is adapted for use in systems wherein the differential of current determining the status of the relay is relatively small. Some of the conditions placed upon the relay are that it must not close due to the discharge of battery current ranging in value upwardly from a relatively small value, and that it should close when the current produced by the generator is relatively small. For example:

Let the minimum engine cranking current be 10 amperes at 32 volts. The series winding 178 of relay 35 which is responsive to battery charge and discharge carries this current. One condition placed upon relay 35 is that its contacts must not close at 10 amperes battery discharge. The relay 35 must be constructed to open its contacts in response to a battery discharge current which is less than 10 amperes by a safe margin in order to avoid the possibility that the battery discharge during cranking would not cause the opening of the contacts of relay 35. This is important when it is considered that the relay 35 by permitting its contacts to open during the generating operation, serves to cause the load switch 36 to permit the closing of the circuit to the heating coil 214 of the cranking cut-out 37, and that said cut-out 37 will cause the switch 34 to disconnect the cranking circuit when the battery discharge exceeds a certain amount. Therefore it is required that the contacts of relay 35 shall open at 5 and 6 amperes battery discharge and remain open at greater discharge currents.

The contacts of relay 35 should close when the generator current is small because, before the load switch 36 closes to change the status of the dynamo from a differential compound generator to a simple shunt generator, the dynamo output is limited by the bucking series field. The dynamo speed is limited by the engine throttle governor. It is therefore desirable that the contacts of relay 35 close at one ampere current generated in order that as soon as possible after the engine becomes self operative, the status of the dynamo will be changed by the load switch 36 to a simple shunt generator and its generating output will increase.

The circuits are such that all of this one ampere passes through the relay winding 178. None is diverted for other purposes, since the heating coils 214 and 230 are supplied with current by the battery. This circuit arrangement is advantageous in order that the load switch relay contacts will close at the governed engine speed, but is somewhat disadvantageous at the time when the relay contacts open.

Assume that the engine becomes inoperative for lack of fuel: As the engine speed decreases to zero, the charging current falls to zero and the discharge current increases to 5 or 6 amperes when the contacts of relay 35 open to cause the load switch to open to prevent battery discharge to the power circuit, and to cause the cranking cut-out heating coil 214 to become operative to effect the interruption of the cranking circuit. Before the contacts of relay 35 open, the dynamo will operate as simple shunt motor; and the field being relatively weak, the motor will attain a relatively high speed. At the instant the contacts of relay 35 open to cause the load switch 36 to change the status of the dynamo from a shunt motor to a cumulative compound motor, the counter E. M. F. of the armature will be relatively great for an instant. Since none of this momentary current is diverted into coils 214 or 230, but all must pass through coil 178 of relay 35, there is a tendency for the relay contacts to close again to cause the load switch 36 to interrupt the circuit to the cranking cut-out coil 214, and to change the status of the dynamo back to simple shunt. Were it not for certain constructions to be described, this cycle of operation might be repeated indefinitely, that is, the armature 172 of relay 35 would move up and down intermittently to close the relay contacts instead of remaining down to maintain the relay contacts open.

Therefore another condition is imposed upon the relay 35; and that is, the relay 35 must not close its contacts by reason of momentarily high counter E. M. F. of the armature during operation as a cumulative compound motor at the high speed referred to. Therefore the relay 35 operates in such a manner that the load switch 36 does not permit rendering the dynamo series field 51 operative to assist the shunt field 50 until the plunger 186 of relay 35 is in such a position that the momentary counter E. M. F. just referred to will not cause the plunger 186 to effect the closing of the relay contacts again. To accomplish this result the plunger 186 is provided with a weight 189, and a "lost motion" connection is provided between the plunger 186 and the armature 172 which is counter weighted by weight 174 tending to hold the relay contacts closed until over balanced by the weight of the plunger 186 and weight 189. It has been found that this construction produces a condition such that plunger 186 will not be moved into contact closing position by the momentary counter E. M. F. referred to. Further detail description is to be found in the copending application of Frank F. Starr, Serial No. 698,777 filed March 12, 1924.

The cables 240, 241 and 242 contain the wires connecting the control panel 26 with the power, lighting and battery circuits, respectively. The cable 243 contains the wires connecting the dynamo, ignition apparatus, intake heating coil, governor and control panel 22 with the control panel 26.

Summary

The electrical system of power plant control includes a full-automatic system and a semi-automatic system of control. A manually operable selecting switch determines whether the aparatus shall operate as a semi-automatic or a full-automatic system.

In the semi-automatic system the plant is started manually; and in the full-automatic system, the plant is started automatically (a) by the storage battery when the state of charge falls below a certain amount, or (b) in response to an excess demand in a lighting circuit, or (c) in response to any demand in the power circuit.

In the semi-automatic system the plant is stopped automatically when the demand for current in the lighting and power circuits is below a certain current value, provided the battery has reached a desired state of charge. If the battery has not received the desired charge, when the demand in the lighting and power circuits falls below a certain minimum, the plant will continue to operate until the battery demand is satisfied. In the full-automatic system, the plant is stopped automatically when the power demand ceases or when the lighting circuit demand is below a certain minimum, provided the battery demand is satisfied. But if the battery has not received the desired amount of charge, the plant will continue to operate until the battery demand ceases as in the case of the semi-automatic system.

The state of charge of the battery is determined by an ampere-hour meter which is part of the means which functions in the semi-automatic system and in the full automatic system to cause the plant to stop automatically, as well as functioning in the full-automatic system to cause the plant to start automatically. The ampere-hour meter 31 controls the circuit to the shunt winding 64 of the manual starting switch 23 to render the same inoperative when the battery is charged and said meter also controls the circuit of winding 147 of starting switch relay 33 to render said relay operable to start the plant and to permit said relay to stop the plant when the battery becomes discharged and charged, respectively.

By means of either system of control, the plant can be caused to operate to supply current for power and lighting purposes although the battery may then be fully charged. The plant is controlled by an electric governor so that the battery will not be overcharged by the operation of the plant to supply other current demands. If the battery is undercharged when these other demands are being supplied, the battery may receive a small charging current; but, in any event, the battery is not normally required to supply any other current demand while the plant is operating. In case of abnormal load more than the generating plant capacity, the battery must then supply the excess, but a signal warns the operator of this fact.

While the form of embodiment of the invention as herein disclosed, constitutes a preferred form, it is to be understood that other forms might be adopted, all coming within the scope of the claims which follow.

What is claimed is as follows:

1. Electrical generating apparatus comprising in combination, a prime mover; a generator driven by the prime mover; a control system having means for starting the prime mover; a second control system having means for starting the prime mover; means common to both control systems for stopping the prime mover upon satisfaction of demand for energy from the generator; and means for selectively rendering either system of control operable.

2. Electrical generating apparatus comprising in combination, a prime mover; a generator driven by the prime mover; a control system having means for starting the prime mover; a second control system having means for starting the prime mover automatically in response to a demand for current from the generator, means common to both control systems for stopping the prime mover upon satisfaction of demand for energy from the generator; and means for selectively rendering either system of control operable.

3. Electrical generating apparatus comprising in combination, a prime mover; a generator driven by the prime mover; a storage battery adapted to be charged by the generator; a control system having means for starting the prime mover; a second control system having means for starting the prime mover automatically in response to a demand for current from the generator; means common to both control systems for stopping the prime mover in response to a relatively high state of battery charge; and means for selectively rendering either system of control operable.

4. Electrical generating apparatus comprising in combination, a prime mover; a generator driven by the prime mover; a storage battery adapted to be charged by the generator; a control system having means for starting the prime mover; a second control system having means for starting the prime mover automatically in response to a relatively low state of battery charge; means common to both control systems for stopping the prime mover in response to a relatively high state of battery charge; and means for selectively rendering either system of control operable.

5. Electrical generating apparatus comprising in combination, a prime mover; a prime mover control device; a generator driven by the prime mover; a control system having means for starting the prime mover including a relay for controlling said device; a second control system having means for starting the prime mover and including a relay for controlling said device; common means for controlling either of said relays for actuating the control device to stop the prime mover upon satisfaction of demand for energy from the generator; and means for selectively rendering either system of control operable.

6. Electrical generating apparatus comprising in combination an internal combustion engine, ignition apparatus for the engine; a generator driven by the engine; a control system having means for starting the engine and for rendering the ignition apparatus operable; a second control system having means for starting the engine and for rendering the ignition apparatus operable; means common to both control systems for interrupting the ignition apparatus to stop the engine upon satisfaction of demand for energy from the generator; and means for selectively rendering either system of control operable.

7. Electrical generating apparatus comprising in combination, a prime mover; a generator driven by the prime mover; a control system having means for starting the prime mover; a second control system having means for starting the prime mover; a storage battery adapted to be charged by the generator through either control systems and including a common battery charging circuit; means in said battery charging circuit for rendering either system of control inoperative, for maintaining the prime mover operative, in response to a state of high battery charge; and means for selectively rendering either system of control operable.

In testimony whereof I hereto affix my signature.

FRANK F. STARR.